Jan. 15, 1935. W. F. OLIVER 1,988,395
HYDRAULIC BRAKE SYSTEM
Filed Feb. 13, 1928 2 Sheets-Sheet 1
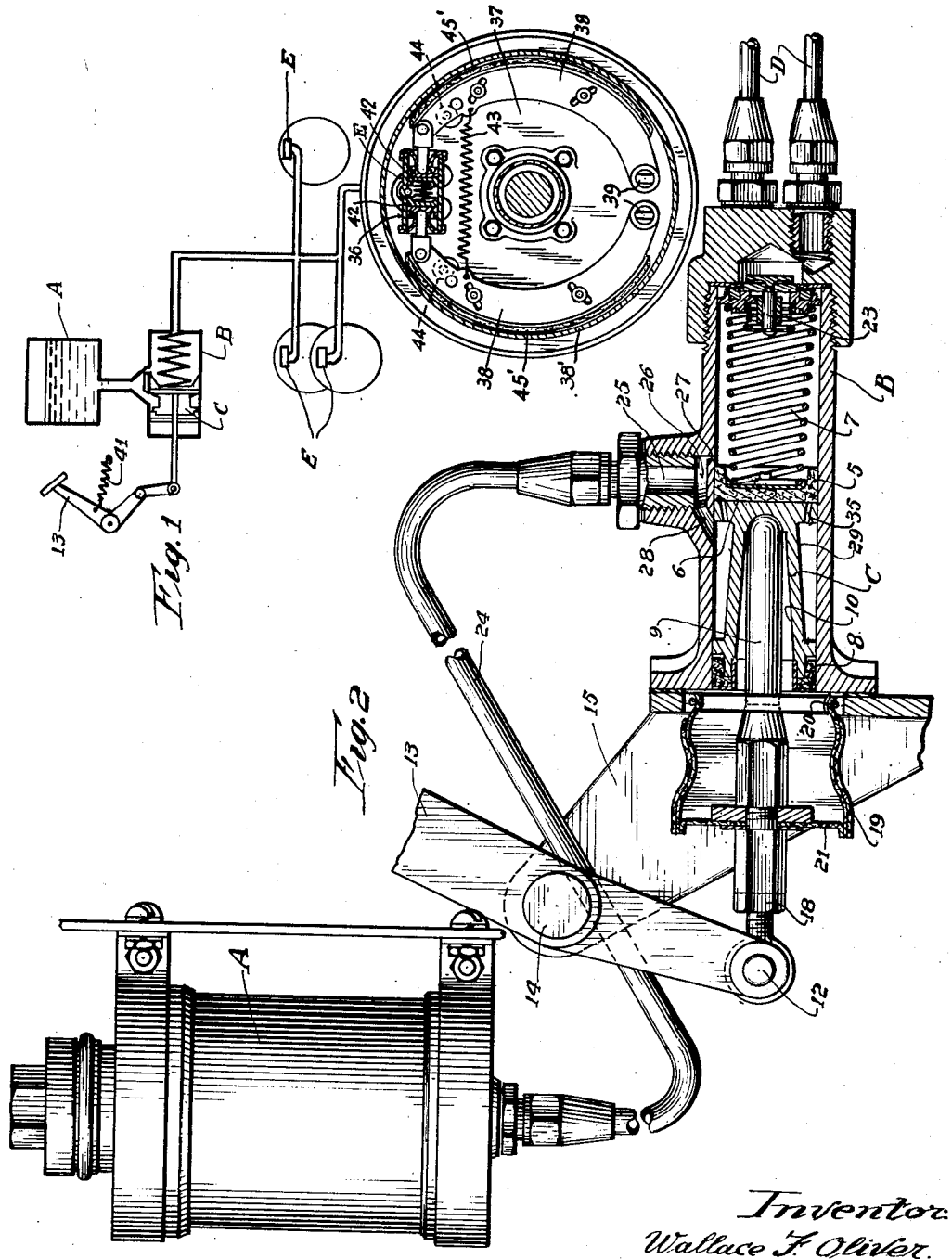
Inventor.
Wallace F. Oliver.
By: Williams, Bradbury,
McCaleb & Hinkle
Attorneys Jan. 15, 1935.  W. F. OLIVER  1,988,395
HYDRAULIC BRAKE SYSTEM
Filed Feb. 13, 1928  2 Sheets-Sheet 2

Inventor:
Wallace F. Oliver.
By: Williams, Bradbury, McCaleb & Hinkle
Attorney.

Patented Jan. 15, 1935

1,988,395

UNITED STATES PATENT OFFICE 1,988,395

HYDRAULIC BRAKE SYSTEM

Wallace F. Oliver, Detroit, Mich., assignor to Hydraulic Brake Company, Los Angeles, Calif., a corporation of California Application February 13, 1928, Serial No. 253,933
Renewed December 9, 1933

19 Claims. (Cl. 60—54.6)

My invention relates to improvements in master cylinders for hydraulic systems. The invention will be explained as embodied in the hydraulic wheel brake system for a motor vehicle.

An object of the invention is to provide an improved master cylinder and fluid supply for hydraulic systems.

A further object is to provide a master cylinder and fluid supply for hydraulic systems which automatically expels air bubbles from the fluid in the system and more particularly in the master cylinder.

Another object is to provide a master cylinder and fluid supply for hydraulic systems which, upon each retractile movement of the master piston, admits fluid to the fluid column in greater quantities than actually required for operation and in which surplus fluid so admitted is discharged into the reservoir until the proper quantity of fluid remains in the column. I refer here to the fluid column as including fluid within the master cylinder and in front of the piston and in the pipes and wheel cylinders.

A further object is to provide a master cylinder and fluid supply for hydraulic systems in which a liquid seal is maintained at all times about the piston packing and fluid bleeds, to preclude the entrance of air into the fluid column.

A further object is to provide a master cylinder and fluid supply for hydraulic systems in which the fluid supply is entirely cut off from the master cylinder upon the protractile movement of the piston but in which communication is reestablished during the retractile movement of the piston.

Other objects and advantages will be more particularly pointed out in the following specification and appended claims.

The invention is illustrated in the accompanying drawings forming a part of this application, in which Figure 1 is a diagrammatical view illustrating a complete hydraulic brake installation including the master cylinder;

Figure 2 is a side elevation, partially in section, of the master cylinder and fluid reservoir;

Figure 3:
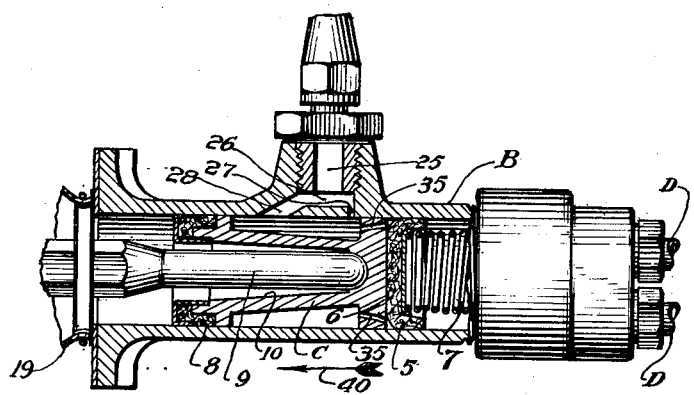
Figure 3 is a view, partly in section, of the master cylinder with the piston on its retractive stroke.
Figure 4:
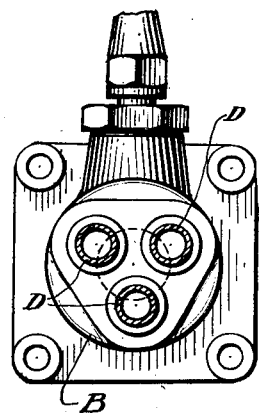
Figure 4 is an end elevation of the mechanism illustrated in Figure 3.

In general, the invention consists of a reservoir A, a cylinder B disposed in a plane beneath the reservoir, a manually actuated piston C within the cylinder, fluid pressure delivery pipes D communicating with the fluid pressure operated wheel brakes E, and a system of passages and recesses in the cylinder and piston for replenishing fluid in the cylinder and for exhausting air bubbles from the cylinder.

The piston C is elongated and has a packing cup 5 loosely fitted against its innermost face 6 and normally held there in place by compression spring 7 which also assists in moving the piston to its retractive position. The outermost end of the piston has a packing ring 8 for preventing fluid from escaping from about the piston. As the fluid is not under heavy pressure at this point of the piston, a packing ring of the type illustrated is ample for the purpose.

The piston C engages with a piston rod 9 which is inserted within a deep pocket 10 formed centrally of the piston and extending inwardly from its outer end. The opposite end of the rod 9 is pivotally connected at 12 to a foot pedal 13 which, in turn, is pivotally supported at 14 upon a fixed bracket 15. The bracket 15 also serves to support the cylinder B. The length of the rod 9 may be altered by an adjusting member 18 forming a part of the rod assembly.

In order to exclude dust and other extraneous substances from the walls of cylinder B, a flexible cylindrical boot 19 is provided, one end of which is secured by a ring 20 to the bracket 15 and the opposite end of which is secured to a disc 21 mounted concentrically about the rod 9.

A double acting check valve 23 is mounted at the innermost end of the cylinder B and performs the function of maintaining a slight positive pressure in the fluid system including the fluid pressure wheel brake cylinders and the pipes D, thus by keeping air out of the piping and wheel cylinders reducing the possibility of the admission of air into the master cylinder to a minimum degree.

The fluid used in the brake system is a special oil which does not become thick at ordinary low temperatures and a supply of this oil is maintained in the reservoir A where it is free to flow by gravity through a tube 24, through an internally bored threaded plug 25 into a chamber 26 formed in the cylinder wall at the top and mid point of the cylinder.

A small passage 27 through the cylinder wall communicates with the interior of the cylinder immediately in front of the inner end of the packing cup 5 when the piston is in its fully retracted position. A larger passage 28 connects the chamber 26 with the cylinder at a point intermediate the length of the piston. The piston C has a relatively deep annular recess 29 on its outer wall extending longitudinally throughout the major part of the piston so that a relatively large quantity of fluid may be maintained about the piston and fed thereto through the passage 28. The length of the recess 29 is such as to maintain communication between the passage 28 and the recess throughout the full piston movement.

A plurality of passages 35 is provided through the forward portion of the piston interconnecting the recess 29 with that space immediately in front of the piston and which is closed when the packing cup engages with the inner end of the piston.

The reservoir A is usually mounted on the engine side of the dash of the automobile and is thus elevated above the master cylinder B which is normally located beneath the floor board of the machine. This elevation of the reservoir relative to the master cylinder imposes a static head on the fluid in the master cylinder and in the recess about the piston, thus maintaining this fluid at a pressure slightly above atmospheric.

The wheel brake mechanism comprises a motor cylinder 36 mounted on a pan 37, and brake shoes 38 supported on anchor pins 39 and moved into engagement with the brake drum 38' by pistons 42. A spring 43 withdraws the brake shoes from engagement with the brake drum and normally holds them against stops 44 which are adjustable to compensate for wear of the brake lining 45'.

In operation, with reference to Figure 3, upon every retractive movement of the piston C in the direction of arrow 40 the packing cup 5 will become unseated from against the adjacent face of the piston and that space between the packing cup and the piston will receive fluid passing from the recessed portion 29 through the passages 35. At the same time fluid from reservoir A will constantly replenish the fluid thus exhausted from the recessed portion 29. By reason of the fact that the rod 9 has only pushing connection with the piston C, the spring 41 returns the foot pedal independently of the master piston C. At the same time the spring 7 returns the cup 5 and piston C somewhat more rapidly than they would be returned by the return fluid from the wheel cylinders E and the pipe lines D, thus causing a slippage of fluid out of the space behind the cup washer 5 into the working space of the master cylinder during each ordinary return stroke of the master piston C. As a result of this mode of operation, at the end of the retractive movement of the piston C there is a greater quantity of fluid in the cylinder B, the pipes D and the wheel cylinders E than that required to fill them when the pistons in the cylinders E and the piston C are in their normal positions. Therefore, this excess fluid passes upwardly through the port 27 into the passage 25 which is connected by pipe 24 to the reservoir A. If, at this time, bubbles of air have accumulated in the master cylinder B they will be carried out through the port 27 with the excess fluid.

The herein described brake system and fluid supply need, therefore, never fail for want of sufficient fluid in the cylinder, pipes D, or pressure operated wheel brakes and all lost motion in the fluid system is eliminated.

Immediately upon initial pedal movement the fluid in the system becomes operative to cause responsive movement of the wheel brakes.

As the brake linings on the brake shoes operated by the wheel cylinders E wear, the brake shoe stops should be gradually adjusted to maintain the clearance between the linings and the brake drums small enough so that the amount of fluid required for the operation of the brakes will not require the foot pedal 13 to travel entirely to the floor board. The amount of fluid in the system for permitting the adjustment of the brake shoes is automatically increased through the port 27 as the brake shoes are adjusted outwardly.

Figure 5:
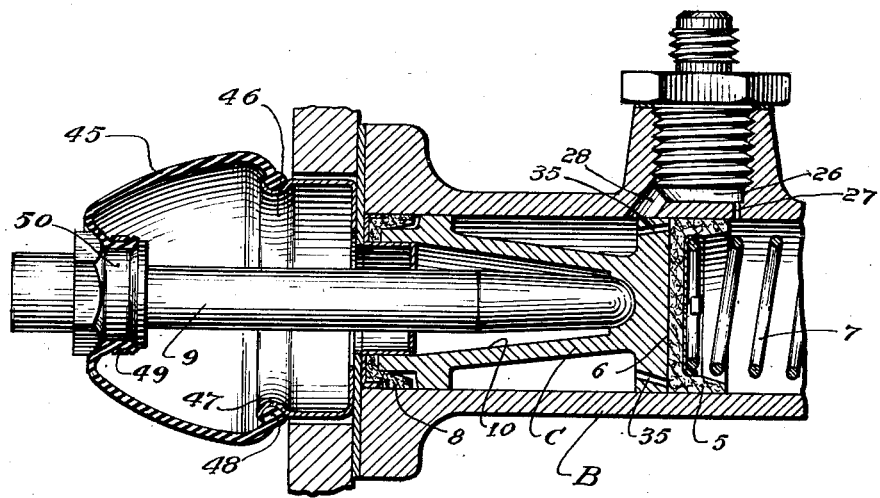
Figure 5 is a sectional view of a modified form of the master cylinder structure.

In Figure 5 I have illustrated a slight modification of the master cylinder, the change being limited solely to the construction of the dust boot about the rod 9. In this form of the invention I secure the inner end of a flexible boot 45 to a fixed metallic ring 46. The ring 46 has an annular groove 47 for receiving thereabout one end 48 of the boot. The opposite end is turned inwardly and fixed by means of a resilient band 49 to an enlarged portion 50 of the rod 9.

I claim:

1. In a hydraulic brake system, a master fluid pressure cylinder, a manually advanced piston in said cylinder, a fluid pressure delivery port in said cylinder for connection with fluid pressure actuated brakes, a source of fluid supply, a passage connecting the cylinder with said fluid source at a point immediately in front of said piston when the piston is in its fully retracted position, a flexible cup forming a part of said piston, and means for admitting fluid from the fluid source to the cylinder through said piston and around said flexible cup to the space in front of the piston during the entire retractile movement of the piston.

2. In a hydraulic brake system, a master fluid pressure cylinder, a piston within the cylinder having packing at each end thereof and being formed with a recess in its side wall intermediate its length, a source of fluid supply connected with said cylinder to deliver fluid at all times to the recessed portion of said piston, means for conducting fluid from the recessed portion of the piston to the cylinder in front of the piston upon the retractile movement of the piston but for preventing the return movement of the fluid, and other means for returning excess fluid from in front of the piston to the fluid source when the piston is in its retracted position.

3. In a hydraulic brake system, fluid pressure operated wheel brakes, a master cylinder communicating with said fluid pressure wheel brakes, a source of fluid supply, a recessed piston in said cylinder for transmitting fluid pressure from said master cylinder to the fluid operated wheel brakes, and means for conducting fluid from said source through the recess in said piston to the cylinder in front of said piston upon the relatively quick return of the piston so as to maintain the master cylinder filled with fluid, and other means for permitting the escape of a part of the fluid from the master cylinder when the piston is retracted to relieve the back pressure from the wheel cylinders, thus maintaining the fluid system at all times filled with a maximum amount of fluid.

4. A master fluid pressure cylinder for wheel brakes, a piston having a close working fit in said cylinder, a packing cup loosely fitted against the face of the piston, a spring for returning the said piston to its retracted position and for bearing the packing cup against the piston face adapted to engage the packing cup inwardly of the periphery, said piston having a recessed part intermediate its length, a source of fluid supply communicating with the recessed part of said piston within said cylinder, and a passage through the face of said piston near the periphery of the piston connecting the recess with the cylinder in front of the piston when the periphery of the packing cup is apart from the piston as in the retractile movement of the piston.

5. A master fluid pressure cylinder for wheel brakes, a piston having a working fit in said cylinder, a packing cup loosely fitted against the face of the piston, a spring for returning the said piston to its retracted position and for bearing the packing cup against the piston face adapted to engage the packing cup inwardly of the periphery, said piston having a recessed part intermediate its length, a source of fluid supply communicating with the recessed part of said piston within said cylinder, a passage through the face of said piston near the periphery of the piston connecting the recess with the cylinder in front of the piston when the periphery of the packing cup is apart from the piston as in the retractile movement of the piston, and a passage connecting the fluid source with the cylinder in front of the piston when the piston is in its fully retracted position.

6. A master fluid pressure cylinder for hydraulic brake systems, a piston in said cylinder for creating fluid pressure in said cylinder upon the protractile movement of the piston, said cylinder being open at its outer end to permit the introduction of a piston actuator therein, packing for said piston at the front and at the rear of the piston, a fluid supply source continuously communicating with the cylinder at a point between the piston packings, said piston having a passage through its face to conduct fluid therethrough from the space between its packings to the cylinder in front of the piston.

7. In a hydraulic brake system, a master cylinder, a movable piston within the cylinder, a packing means carried by the piston, a second packing means, said second packing means being spaced from the first packing means, said piston having a portion intermediate the packing means spaced from the wall of the cylinder forming a fluid seal, means for maintaining a pressure greater than atmospheric pressure upon the fluid in the seal during a greater part of the movement of the piston, said means including a passageway continuously connecting said seal with a source of fluid, and means connecting said fluid seal with the space in front of the piston throughout the retractile movement thereof to permit flow of fluid from said seal past said piston.

8. In a hydraulic brake system, a master cylinder, a piston reciprocable therein, means extending through one end of the cylinder for actuating the piston, axially spaced packings carried by the piston, a liquid reservoir and conduit means continuously communicating therefrom to the piston intermediate said packings at a point within the reciprocal limits of the piston, and means connecting the space between said packings with the space in front of the piston during the retractile movement thereof to permit flow of fluid past the piston during such movement.

9. In a hydraulic brake system for motor vehicles, a master fluid pressure cylinder, a piston within the cylinder having packing at each end thereof and being formed with a recess in its side wall intermediate its length and between said packings, the packing at the rear of said piston being formed to seal against the outflow of fluid from the recess and the packing at the front of said piston being in the form of a cup washer permitting free flow of fluid from said recess into the forward end of the cylinder but preventing flow from the forward space of said cylinder past the cup into said recess, pedal mechanism for advancing said piston, spring mechanism for returning the pedal mechanism independently of the piston, a source of fluid supply connected with said cylinder to deliver fluid at all times to the recessed portion of said piston, a spring within the cylinder abutting said cup washer for retracting said piston, said piston having passages through its face for conducting fluid from the recessed portion of the piston to the space between the face of the piston and the cup washer upon the retractile movement of the piston, the cup washer serving to close said passages for preventing the return movement of fluid from the cylinder through said passages, a wheel cylinder, a conduit connecting said cylinders, and brake mechanism actuated by said wheel cylinder, release of said brake mechanism serving to expel excess fluid from in front of the master cylinder piston to the fluid source when the master cylinder piston is in its retracted position.

10. In a hydraulic system of the class described, the combination of a power cylinder, a piston within the cylinder normally in its retracted position, a packing cup carried by the end of the piston, a packing ring carried by the piston, said piston having an annular recess between the packing cup and the packing ring, said recess being connected with the space in front of said piston during the retractile movement of said piston, whereby fluid from said recess flows past said piston and packing cup during the retractile stroke of said piston, said cylinder having a duct adjacent the edge of the packing cup when the piston is in its retracted position and positioned over the annular recess when the piston is in its protracted position, and a fluid reservoir in communication with said recess and said duct.

11. A compressor for a hydraulic system comprising a cylinder, a piston reciprocable therein, actuating means for the piston extending through one end of the cylinder, a packing for the forward end of the piston, a second packing for the piston carried thereby at a spaced distance rearwardly of the first packing and sealing against the outflow of fluid from the space between said packings, a port communicating with the interior of the cylinder through the upper wall thereof, a liquid reservoir communicating with said port, said port being positioned forwardly of said first-mentioned packing when the piston is in its retracted position and communicating with the piston intermediate said packings during protracted positions of the piston, a second port continuously connecting said reservoir with the piston intermediate said packings and means connecting the space between said packings with the space in front of the piston during the retractile movement of the piston for the purpose of automatically compensating the volume of the liquid system forwardly of the piston.

12. In a hydraulic system of the class described, a compression cylinder, a piston reciprocable in said cylinder, means for advancing said piston, a fluid pressure delivery port in said cylinder for connection with fluid pressure actuated mechanism; a second port in the wall of said cylinder immediately in front of said piston when the latter is in its fully retracted position, a fluid reservoir in communication with said second port and with a point in rear of said piston, a flexible member associated with said cylinder and sealing against said cylinder on the forward stroke of said piston, said flexible member collapsing during the return stroke of said piston to permit flow of fluid therepast to compensate for loss of fluid from that part of the system in front of said piston.

13. In a hydraulic system of the class described, a compression cylinder having an open end, a piston reciprocable in said cylinder, means for advancing said piston, said means including a piston rod extending through the open end of said cylinder, a fluid pressure delivery port in said cylinder for connection with fluid pressure actuated mechanism, a second port in the wall of said cylinder immediately in front of said piston when the latter is in its fully retracted position, a space in rear of said piston for containing fluid, a third port in said cylinder communicating with said space, a fluid reservoir in communication with both of said last-named ports, and a flexible member associated with said piston and sealing against said cylinder on the forward stroke of said piston, said flexible member collapsing during the return stroke of said piston to permit flow of fluid therepast to compensate for loss of fluid from that part of the system in front of said piston.

ward piston head, a pipe connection for connecting the forward end of the cylinder to the wheel brakes, and a reservoir for the operating liquid connected with the cylinder and supplying operating liquid to the said inlet port.

16. In hydraulic brake apparatus for automobiles, the combination of a cylinder; a plunger including two separated piston heads of equal diameter filling the cylinder bore and mounted to move in the cylinder; and means connected with the plunger for advancing the same to compress liquid forward of the said piston heads and thereby to supply the brakes; said plunger having a position of rest and said cylinder having an inlet port for the operating fluid just in advance of the forward piston head when said plunger is in said position of rest, having a passage leading from the inlet port into the interior of the cylinder back of the forward piston and being in continuous communication with said cylinder back of the forward piston, and having an outlet at its forward end for connection to the brakes.

17. Hydraulic brake apparatus comprising a fluid pressure cylinder; a reservoir associated with said cylinder and positioned above said cylinder; a piston, having two separated heads of equal diameter, positioned in said cylinder to occupy a normal rearward position therein when the brake apparatus is released, a packing for the forward head preventing flow of liquid past the forward head rearward of the cylinder; means for connecting the reservoir to said cylinder at a point